United States Patent
Alvarez et al.

(10) Patent No.: US 8,483,268 B1
(45) Date of Patent: Jul. 9, 2013

(54) METHOD AND APPARATUS FOR FRAME, FIELD AND MACROBLOCK ADAPTIVE PROGRESSIVE/INTERLACE CODING SELECTION

(75) Inventors: José R. Alvarez, Sunnyvale, CA (US); Simon Butler, San Rafael, CA (US)

(73) Assignee: GEO Semiconductor Inc., Santa Clara, CA (US)

(*) Notice: Subject to any disclaimer, the term of this patent is extended or adjusted under 35 U.S.C. 154(b) by 1751 days.

(21) Appl. No.: 11/374,762

(22) Filed: Mar. 14, 2006

(51) Int. Cl.
*H04N 7/12* (2006.01)

(52) U.S. Cl.
USPC .................................................. 375/240.01

(58) Field of Classification Search
USPC .................. 375/240.01–240.02, 240.16
See application file for complete search history.

(56) References Cited

U.S. PATENT DOCUMENTS

| | | | | |
|---|---|---|---|---|
| 7,209,106 B2* | 4/2007 | Lu et al. | ........................ | 345/89 |
| 7,609,766 B2* | 10/2009 | Zeng | ........................ | 375/240.2 |
| 2007/0030906 A1* | 2/2007 | Cote et al. | ............... | 375/240.16 |
| 2008/0101471 A1* | 5/2008 | Yin et al. | ................ | 375/240.16 |

* cited by examiner

*Primary Examiner* — Sath V Perungavoor
*Assistant Examiner* — James Pontius
(74) *Attorney, Agent, or Firm* — Sughrue Mion, PLLC

(57) ABSTRACT

An apparatus includes a first preprocessor circuit and a second preprocessor circuit. The first preprocessor circuit may be configured to generate a first control signal for each of a plurality of macroblocks of an input image based upon a plurality of statistics for each of the plurality of macroblocks. The second preprocessor circuit may be configured to generate a second control signal based upon a combination of the first control signals of a number of macroblocks of the plurality of macroblocks.

22 Claims, 9 Drawing Sheets

160

| MACROBLOCK PAIR STATS | | | | OUTPUT |
|---|---|---|---|---|
| FTT | FBT | FTB | FBB | F1 F0 |
| 0 | 0 | 0 | 0 | 00 |
| 0 | 0 | 0 | 1 | 00 |
| 0 | 0 | 1 | 0 | 00 |
| 0 | 0 | 1 | 1 | 10 |
| 0 | 1 | 0 | 0 | 00 |
| 0 | 1 | 0 | 1 | 01 |
| 0 | 1 | 1 | 0 | 00 |
| 0 | 1 | 1 | 1 | 00 |
| 1 | 0 | 0 | 0 | 00 |
| 1 | 0 | 0 | 1 | 00 |
| 1 | 0 | 1 | 0 | 01 |
| 1 | 0 | 1 | 1 | 00 |
| 1 | 1 | 0 | 0 | 10 |
| 1 | 1 | 0 | 1 | 00 |
| 1 | 1 | 1 | 0 | 00 |
| 1 | 1 | 1 | 1 | 00 |

A) FRAME ENCODING WITH FRAME BASED STATISTICS

B) FRAME ENCODING WITH FIELD BASED STATISTICS

C) FIELD ENCODING WITH FIELD BASED STATISTICS

D) MBAFF ENCODING WITH FIELD BASED STATISTICS

A) GENERATED REGIONS/STATISTICS

B) COMBINED REGIONS/STATISTICS

150

| STATISTICS | | | | FIELD |
|---|---|---|---|---|
| 3(VHF) | 2(ES) | 1(MS) | 0(M) | |
| 0 | 0 | 0 | 0 | 0 |
| 0 | 0 | 0 | 1 | 0 |
| 0 | 0 | 1 | 0 | 1 |
| 0 | 0 | 1 | 1 | 1 |
| 0 | 1 | 0 | 0 | 0 |
| 0 | 1 | 0 | 1 | 0 |
| 0 | 1 | 1 | 0 | 1 |
| 0 | 1 | 1 | 1 | 1 |
| 1 | 0 | 0 | 0 | 0 |
| 1 | 0 | 0 | 1 | 0 |
| 1 | 0 | 1 | 0 | 1 |
| 1 | 0 | 1 | 1 | 1 |
| 1 | 1 | 0 | 0 | 0 |
| 1 | 1 | 0 | 1 | 0 |
| 1 | 1 | 1 | 0 | 1 |
| 1 | 1 | 1 | 1 | 1 |

FIG. 7

| 160 ↘ MACROBLOCK PAIR STATS | | | | OUTPUT |
|---|---|---|---|---|
| FTT | FBT | FTB | FBB | F1 F0 |
| 0 | 0 | 0 | 0 | 00 |
| 0 | 0 | 0 | 1 | 00 |
| 0 | 0 | 1 | 0 | 00 |
| 0 | 0 | 1 | 1 | 10 |
| 0 | 1 | 0 | 0 | 00 |
| 0 | 1 | 0 | 1 | 01 |
| 0 | 1 | 1 | 0 | 00 |
| 0 | 1 | 1 | 1 | 00 |
| 1 | 0 | 0 | 0 | 00 |
| 1 | 0 | 0 | 1 | 00 |
| 1 | 0 | 1 | 0 | 01 |
| 1 | 0 | 1 | 1 | 00 |
| 1 | 1 | 0 | 0 | 10 |
| 1 | 1 | 0 | 1 | 00 |
| 1 | 1 | 1 | 0 | 00 |
| 1 | 1 | 1 | 1 | 00 |

FIG. 8

| F1 | F0 | MB PAIR CODING DECISION |
|---|---|---|
| 0 | 0 | MBAFF DEFAULT MODE |
| 0 | 1 | FIELD |
| 1 | 0 | FRAME |
| 1 | 1 | UNDEFINED |

FIG. 9

METHOD AND APPARATUS FOR FRAME, FIELD AND MACROBLOCK ADAPTIVE PROGRESSIVE/INTERLACE CODING SELECTION

FIELD OF THE INVENTION

The present invention relates to video processing and/or encoding generally and, more particularly, to a method and/or architecture for frame, field and macroblock adaptive progressive/interlace coding selection.

BACKGROUND OF THE INVENTION

Video sequences can be represented as progressive or interlaced signals. While providing a simple orthogonal way of presenting video material, progressive sampling demands large amounts of bandwidth. Interlaced sampling was created to alleviate bandwidth requirements by sub-sampling a video frame into even and odd lines of video at different times, therefore reducing bandwidth by half. The vertical resolution of a video sequence sampled in the interlaced format is essentially equivalent to the vertical resolution of the progressive representation when there is no motion in the sequence. However, when there is movement in the sequence, and since even and odd lines are sampled at different times, video frames may show visible artifacts due to interfield motion.

Interlaced coding is an important feature of many coding standards such as the MPEG-2 standard and the H.264/AVC or MPEG-4 part 10 standards (International Organization for Standardization ISO/IEC JTC 1/SC 29 WG/11, ISO/IEC 14496-10 Advanced Video Coding Standard 2005, H.264/AVC Video Coding Standard Document). While it is possible to code all interlaced material as separate fields (i.e., Field Coding), some material is more efficiently coded as progressive frames (i.e., Frame Coding). The global selection between field coding and frame coding is referred to as Adaptive Frame/Field coding (AFF). Better compression efficiency can be obtained by adaptively coding each individual macroblock as either progressive (frame) or interlaced (field). The latter approach is known as Macroblock Adaptive Frame/Field coding, or MBAFF.

Although the H.264/AVC Standard provides better interlaced coding mechanisms than other previous international standards, the problem of properly selecting macroblocks for frame or field coding remains. Improperly selecting material for frame coding when the material should have been coded as interlaced (and vice versa) can cause deleterious effects in coding efficiency and, therefore, quality.

One approach to selecting between frame coding and field coding is (i) to code every frame as progressive (frame coding) and interlaced (field coding) and (ii) to code each macroblock as progressive (frame coding) and interlaced (field coding). A final selection is then made as to the best choice in terms of target rate and distortion. Such an approach is taken by the JM reference software developed by the ISO/MPEG Committee (International Organization for Standardization ISO/IEC JTC 1/SC 29 WG/11; ISO/IEC 14496-10 Advanced Video Coding Standard 2005; JM Software Model 10.6). While effective, the above technique requires large amounts of processing power since the material has to be coded multiple times in order to arrive at the optimal solution. The above technique may be referred to as a brute force approach.

A second approach to selecting between frame coding and field coding is to analyze input video at the frame/field level, and together with group of picture (GOP) and rate control criteria, make decisions to code the material as entire frames or fields. Such an approach is described by X. Zhang, A. Vetro, H. Sun, Y. Shi: Adaptive Field/Frame Selection for High Compression Coding. Mitsubishi Electric Research Laboratory Report TR-2003-29, January 2003. However, the second technique uses relatively complex variance computations and relies on knowledge of GOP structures for better performance. Furthermore, the second technique does not address MBAFF coding.

In principle, the best way to code interlaced material is to adaptively code each macroblock as frame or field. Therefore, the selection between frame coding and field coding can be simplified by deriving statistics from the motion vectors obtained by the motion estimation process. When these vectors are examined in a small area, taking into account spatial predictors, a decision can be made as to when to code a macroblock in frame mode or field mode. Such an approach is described in Y. Qu, G. Li, Y. He: A Fast MBAFF Mode Prediction Strategy for H.264/AVC, ICSP Proceedings 2004, p 1195-1198 (Qu et al.).

The approach described by Qu et al. first determines the need for coding the entire frame in progressive or interlace mode, and if the latter case is selected, then the macroblock based decisions are performed. Variances are used as statistical measures for each macroblock. The approach described by Qu et al. has the disadvantage of relying on motion vectors obtained by a motion estimation process that is ruled by rate distortion characteristics that may not fit the nature of interlaced video (i.e., the prediction error minimization is not a good indicator of the interlaced nature of the content). Variances are obtained for frame and field coding modes based on the mean of a large number of macroblocks.

Yet another simplification to the brute force approach is to look at macroblock activity measures based on the sum of absolute differences (SAD) for each macroblock. Such an approach is described in M. Guerrero, R. Tsang, J. Chan: Fast Macroblock Adaptive Frame/Field Coding Selection in H.264, Stanford EE398 Class, Spring 2005 (Guerrero et al.). Together with motion vector analysis and macroblock neighbor considerations, the approach in Guerrero et al. can reduce the effort in classifying the macroblocks for frame or field coding. However, the approach in Guerrero et al. only uses adjacent vertical pixels to derive the activity measure for the macroblock, and furthermore relies on motion vectors that are derived in the normal motion estimation process and, therefore, are optimized to reduce prediction error without consideration to actual interlaced characteristics. Moreover, when considering neighbors, any incorrect coding decisions can be easily propagated in the rest of the picture.

SUMMARY OF THE INVENTION

The present invention concerns an apparatus including a first preprocessor circuit and a second preprocessor circuit. The first preprocessor circuit may be configured to generate a first control signal for each of a plurality of macroblocks of an input image based upon a plurality of statistics for each of the plurality of macroblocks. The second preprocessor circuit may be configured to generate a second control signal based upon a combination of the first control signals of a number of macroblocks of the plurality of macroblocks.

The objects, features and advantages of the present invention include providing a method and/or apparatus for frame, field and macroblock adaptive progressive/interlace coding selection that may (i) achieve similar accuracy to conventional techniques with only simple feature based mechanisms already available as part of a preprocessing step, (ii) allow use of higher level constructs (e.g., neighboring macroblock considerations, neighborhood variances, GOP level processing, rate control assistance, etc.), (iii) use higher level construct(s) to further improve selection accuracy, (iv) implement a linear finite impulse response (FIR) filter, a basic edge detector and/or a basic motion detector to derive feature data and/or (v) average features over entire macroblocks instead of at the pixel level.

BRIEF DESCRIPTION OF THE DRAWINGS

These and other objects, features and advantages of the present invention will be apparent from the following detailed description and the appended claims and drawing's in which:

FIG. 7 is a table illustrating an example of a MBAFF field/frame decision truth table in accordance with a preferred embodiment of the present invention;

FIG. 8 is a table illustrating an example of a MBAFF macroblock pair coding decision truth table in accordance with a preferred embodiment of the present invention;

FIG. 9 is a table illustrating an example of definitions for different states of the macroblock coding decision outputs;

DETAILED DESCRIPTION OF THE PREFERRED EMBODIMENTS

The present invention generally takes advantage of picture characteristics derived during a video preprocessing step. The present invention generally provides an apparatus and/or method for making simple rule-based decisions based on a combination of features (or statistics) that are known to be indicative of optimal frame or field coding. Although the decisions may be made at the macroblock level for Macroblock Adaptive Frame/Field (MBAFF) coding, the decisions may be easily extended to the frame/field level for Adaptive Frame/Field coding (AFF) selection.

Figure 1:
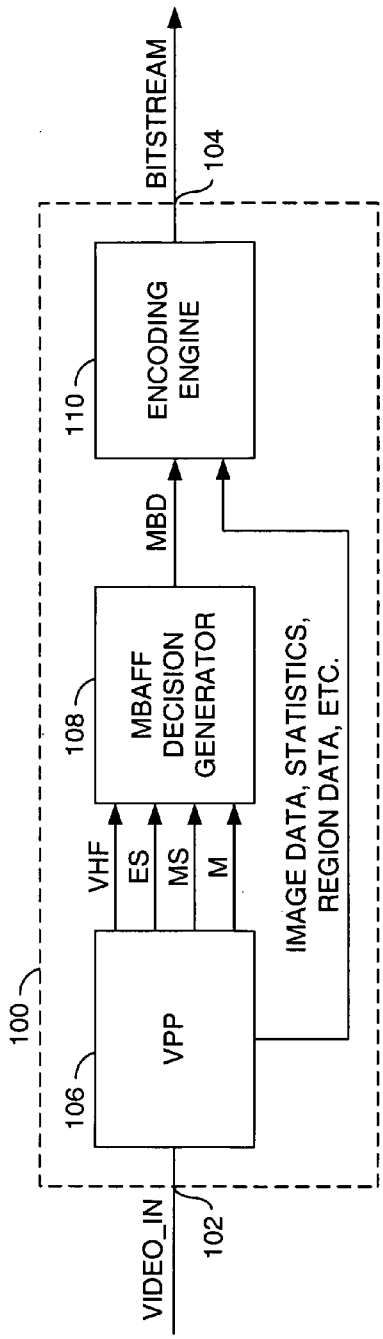
FIG. 1 is a block diagram illustrating a MBAFF decision generator circuit in accordance with the present invention.

Referring to FIG. 1, a block diagram is shown illustrating a system 100 in accordance with a preferred embodiment of the present invention. In one example, the system 100 may be implemented as a processing engine of an H.264 CODEC (coder/decoder). In one example, the system 100 may be configured to condition an input video signal for improved compression and image quality. The system 100 may have an input 102 that may receive a signal (e.g., VIDEO_IN) and an output 104 that may present a signal (e.g., BITSTREAM). The signal VIDEO_IN may comprise a digital (or digitized) video signal (or sequence). In one example, the signal VIDEO_IN may comprise a standard definition (SD) signal (e.g., an ITU-R-656 or CCIR-656 compliant signal) or a high definition (HD) signal (e.g., SMPTE 292-M). The signal BITSTREAM may comprise a compressed (or encoded) data (or bit) stream. In one example, the signal BITSTREAM may comprise a H.264/AVC compliant bit stream.

In one example, the system 100 may comprise a block (or circuit) 106, a block (or circuit) 108 and a block (or circuit) 110. The block 106 may be implemented, in one example, as a video preprocessor (VPP). The block 108 may be implemented, in one example, as a macroblock adaptive frame/field decision generator. The block 110 may be implemented, in one example, as an advanced video coding (AVC) encoding engine. In one example, the block 110 may be implemented as an H.264/AVC (or H.26L) video encoding engine.

In one example, the block 106 may be configured to condition the signal VIDEO_IN to improve compression and image quality. For example, the block 106 may be configured to reduce a spectral content of the signal VIDEO_IN by shaping a signal bandwidth to match bit rate specifications of the block 110. In one example, the block 106 may include spatial and temporal noise reduction.

The block 106 may have a first input that may receive the signal VIDEO_IN, one or more first outputs that may present information (e.g., statistics, region data, image data, etc.) to an input of the block 108 and a second output that may present information (e.g., statistics, region data, image data, etc.) to an input of the block 110. The block 110 may have an output that may present the signal BITSTREAM. In one example, the block 106 may be configured to generate statistics for each macroblock of the signal VIDEO_IN that may be passed to the block 108.

The statistics generated for each macroblock by the block 106 may include, but are not limited to, a vertical high frequency (VHF) statistic, a motion (M) statistic, a spatial edge strength (ES) statistic and a motion edge strength (MS) statistic: The statistics generally provide a measure of a respective macroblock feature. The VHF feature generally refers to high frequency picture information along the vertical direction. For example, a picture of so-called Venetian Blinds has high vertical frequency, and—very likely—low horizontal frequency. The M feature generally refers to the amount of any type of motion between blocks across pictures. For example, if an object occupying a particular block in one picture has moved to another block in a next picture, the amount of motion detected on the former block is high. The ES feature generally refers to the strength of edges of objects occupying a block. For example, when the edge of an object having high luminance contrast with respect to the background of the picture occupies a particular block, the block is said to have a strong edge component. The MS feature generally refers to the motion of edges of objects between blocks across pictures. For example, when the edge of an object has moved from a particular block in one picture to another block in a next picture, the former block is said to have strong moving edge content.

The block 108 may be configured to generate a control signal (e.g., MBD) in response to the statistics received from the block 106. In one example, the signal MBD may be configured to indicate macroblock frame and field coding decisions for the macroblocks presented to the block 110. However, other frame/field coding decisions may be based upon the signal MBD. The block 110 may be configured to control frame and field coding based on the control signal MBD received from the block 108.

Figure 2:
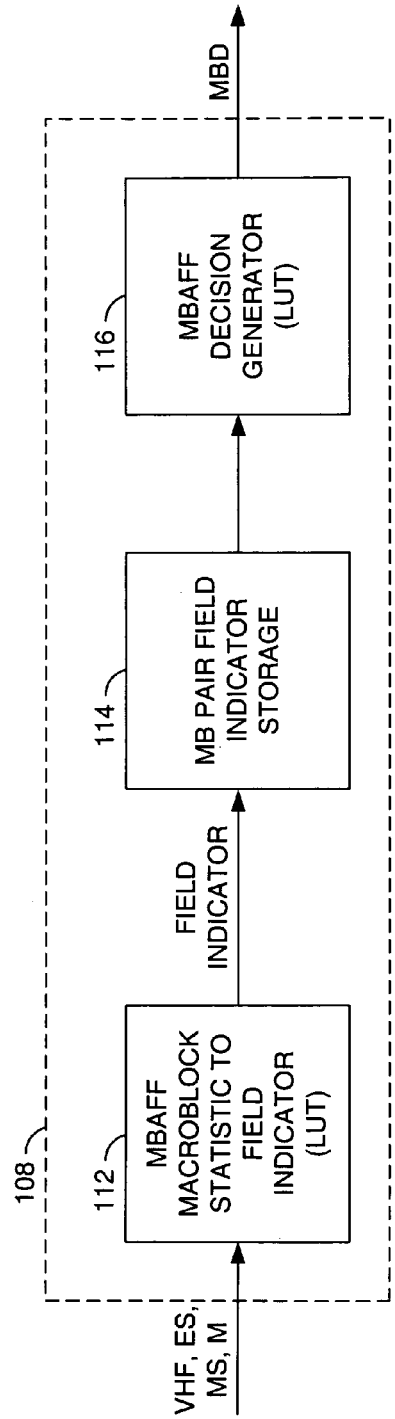
FIG. 2 is a more detailed block diagram illustrating an example of the decision generator circuit of FIG. 1 in accordance with a preferred embodiment of the present invention.

Referring to FIG. 2, a block diagram is shown illustrating an example of a MBAFF decision generator circuit in accordance with a preferred embodiment of the present invention. In one example, the block 108 may comprise a block (or circuit) 112, a block (or circuit) 114 and a block (or circuit) 116. The block 112 may be implemented, in one example, as a MBAFF macroblock statistics to field indicator converter block. In one example, the block 112 may be implemented as a look-up table (LUT). In one example, the block 114 may be implemented as a separate storage device. In another example, the block 114 may be implemented as a portion of a shared storage device. The block 116 may be implemented, in one example, as a MBAFF decision generator block. In one example, the block 116 may be implemented as a LUT.

The block 112 may have an input that may receive information (e.g., the statistics VHF, ES, MS and M) from the block 106 and an output that may present information (e.g., a field indicator signal for each macroblock) to an input of the block 114. The block 114 may have an output that may present information (e.g., the field indicators for a number of macroblocks) to an input of the block 116. The block 116 may have an output that may present the signal MBD. The block 116 may be configured to generate the signal MBD in response to the field indicators received (or retrieved) from the block 114.

Input statistics data are generally processed in macroblock format. In one example, the input statistics may comprise two kinds of data, Region Similarities and statistical features. A region may be defined as a group of blocks that have a set of statistical features in common with each other. For example, the blocks may all have similar DC values, low/high frequency, texture and/or motion. In one example, the degree of similarity may be represented as a number from 0 to 8 and therefore expressed as a 4-bit binary value. Statistical features may be defined as any of a series of picture characteristics collected for each block in the picture. The features may include: Low/High frequency, color information, edge strength and direction, generic motion, edge motion, etc. In one example, a region may represent the background region (e.g., the macroblocks that are not classified in any other regions). In another example, a region may represent an area that contains grassy areas (e.g., blocks with medium texture and green color).

Figure 5:
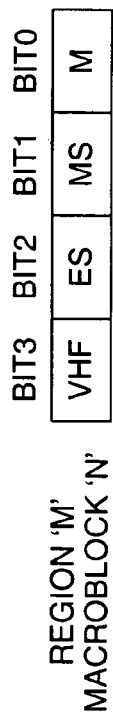
FIG. 5 is a diagram illustrating an example of an encoding method for MBAFF related statistics.

In one example, four bits may be designated for the background region. In a preferred embodiment, the same bits used to represent regions by degree of similarity among neighboring blocks may be used to represent the binary combination of the features VHF, MS, ES and M (e.g., as illustrated in FIG. 5). In one example, each of the features VHF, M, ES, MS may be represented by one bit of information. Each bit may represent whether the particular feature (e.g., VHF, M, ES, MS) has been classified according to some predetermined criteria. As used herein, the term classified generally refers to a measurement (e.g., a comparison with thresholds) of whether the predetermined criteria are met by the feature values.

In one example, the criteria may comprise a percentage of pixels in the macroblock that possess the particular feature (e.g., VHF, M). In another example, the criteria may comprise the combined strength of all pixels in the block (e.g., ES, MS). In yet another example, the criteria may comprise the average of the feature detected over all pixels in the block (e.g., VHF, M, ES, MS). In all cases, the bit corresponding to the particular feature is generally set to '1' (TRUE) only if the pixels in the block fulfill the specified criteria. The four bits assigned to the background region may be used by the block 106 to report the statistics for coding selection in the MBAFF mode (described in more detail in connection with FIG. 5). Coding selection of MBAFF is generally performed by the block 108.

Figure 3:
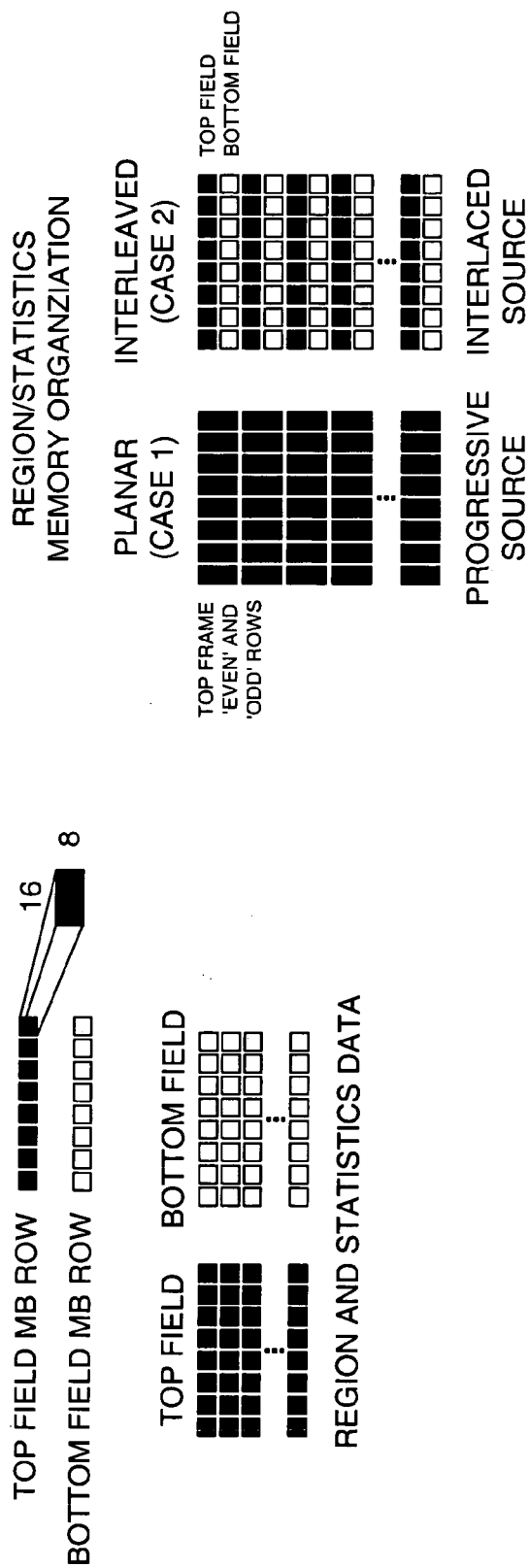
FIG. 3 is a block diagram illustrating an example of statistics field/frame organization.

Referring to FIG. 3, a block diagram is shown illustrating an example of statistics in a frame/field organization. The statistics generated by the block 106 for each macroblock are generally represented by a square in FIG. 3 denoting the two-dimensional nature of the macroblock statistic data. The statistics data may be stored using the two-dimensional format reflecting the two-dimensional nature of macroblock region and statistics data. The block 106 may be configured to store (or present) the statistics data in two formats depending on the nature of the input source video. For planar (or noninterlaced) data, vertically adjacent rows of macroblock statistics data may be organized consecutively on a frame basis (e.g., CASE 1 in FIG. 3). For progressive video, the statistics are generally stored in planar form. For interleaved (or interlaced) data, vertically adjacent (in the temporal domain) rows of macroblock statistics data may be organized in interleaved rows on a field basis (e.g., CASE 2 in FIG. 3). When the input video is interlaced, the statistics are generally stored in the interleaved form.

Statistics data may be generated by the block 106 in fields (e.g., 16×8 blocks) or frames (e.g., 16×16 blocks). When the signal VIDEO_IN is progressive, the block 106 generally produces 16×16 block based statistics stored in the planar format. When the signal VIDEO_IN is interlaced, the block 106 generally produces 16×8 block based statistics stored in the interleaved format. In MBAFF, the signal VIDEO_IN is in interlaced mode. For MBAFF, the block 106 generally produces 16×8 block statistics data. The block 110 may be configured to combine field-based data from the block 106 for coding as either field or frame according to the MBAFF decisions generated by the block 108 using the statistics generated by the block 106.

Figure 4:
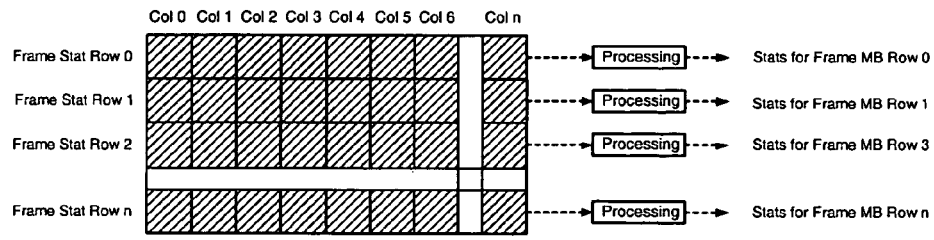
FIG. 4(A-D) are diagrams illustrating a process for combining blocks for field and frame encoding.
Figure 4:
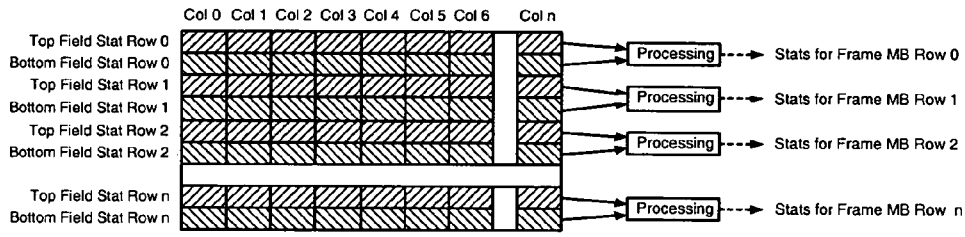
Figure 4:
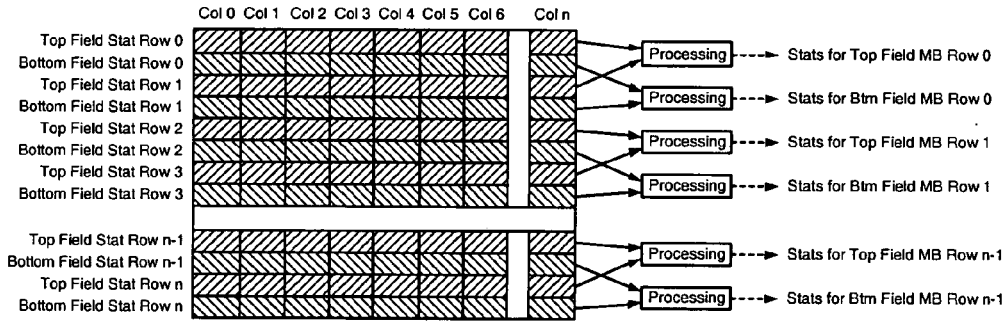
Figure 4:
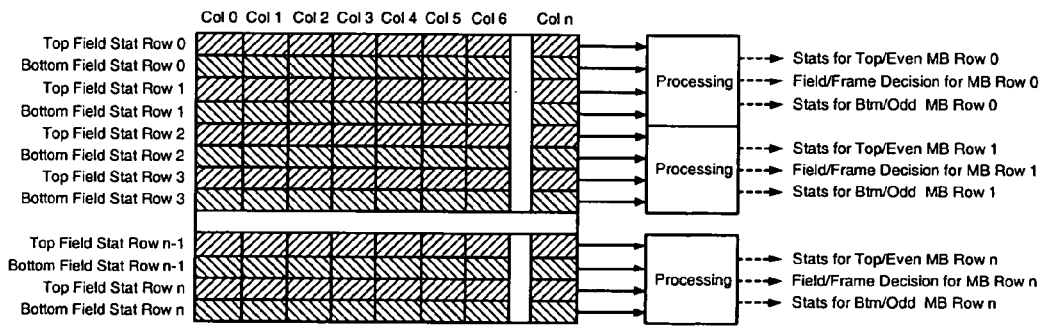

Referring to FIGS. 4(A-D), diagrams are shown illustrating a process for combining block statistics data for field and frame encoding in accordance with a preferred embodiment of the present invention. When the source video is progressive, 16×16 block statistics and region data are generally stored in planar form. For interleaved data, vertically adjacent (in the temporal domain) rows of macroblock region/edge data may be stored in interleaved rows on a field basis. When the source video is interlaced, 16×8 block statistics and region data are generally stored in the interleaved form.

When the statistics generated by the block 106 are in progressive format, only frame encoding is used and only a minimal amount of statistics data processing is used (e.g., FIG. 4A). When the statistics generated by the block 106 are in the interleaved format, the statistics may be combined for either field or frame macroblock encoding. For example, the statistics data may be averaged between two blocks. FIGS. 4(B-D) generally illustrate examples of methods by which blocks may be combined for field or frame encoding.

When the picture structure is frame, statistics may be automatically combined in frame mode (FIG. 4B). When the picture structure is field, statistics may be automatically combined in field format (FIG. 4C). When the picture structure is MBAFF, macroblocks may be encoded either in frame or field mode within a frame (FIG. 4D). The field/frame decision is generally made by a statistics processor for vertically adjacent pairs of macroblocks. The vertically adjacent pairs of macroblocks are generally referred to as macroblock pairs.

Referring to FIG. 5, a diagram is shown illustrating an example of a four-bit field for communicating statistics data for the MBAFF mode. Interlaced sampling using a quincunx pattern generates a spectrum in which vertical frame frequencies may be indistinguishable from interfield motion. For example, a completely white field interlaced with a completely black field generally produces a strong temporal component at the frame level, so that displayed frames generally appear to flicker. Since in the above example every other line in the frame will be either white or black, the vertical frame frequency may be considered the maximum allowed by sampling (e.g., a Nyquist frequency).

More common cases are not so extreme, but generally involve objects that move from one field to another and therefore appear to have vertical detail at the frame level, which would not have been present if the object had remained static (such an artifact is sometimes referred to as 'feathering'). In this example, the edges of the moving object would be better coded in field mode since the vertical frequency would be lower and therefore easier to code. If the edges are coded in frame mode, the aforementioned field motion would be coded as high vertical frequencies.

Other common cases involve not edges, but textured objects that move from one field to another and which, in the absence of motion, would appear to have similar vertical frequency content in both frame and field representations. There may not be any advantages in coding these objects in frame or field mode, but the amount of vertical detail and amount of motion may suggest biasing the choice one way or another. The coding mode favored would lean toward the indication of minimum vertical frequency (frame or field) at a minimum amount of motion.

The present invention generally uses the four macroblock-based feature statistics (e.g., Vertical High Frequency (VHF), Motion Detected (M), Spatial Edge Strength (ES) and Moving Edge Strength (MS)) to derive a decision whether to code a macroblock in frame or field mode. For each feature, a set of thresholds may be used in determining whether the respective macroblock is classified as having a certain amount of vertical detail (e.g., indicated by the statistic VHF), a certain amount of motion (e.g., indicated by the statistic M), a certain amount of static (two-dimensional) edge information (e.g., indicated by the statistic ES) and a certain amount of moving (two-dimensional) edge information (e.g., indicated by the statistic MS). The set of thresholds may be programmable.

For each feature, a binary indicator (e.g., a bit) may be set to reflect whether the macroblock is classified to meet the feature criteria indicated by the thresholds. For example, the bit may be set to a binary 1 value to indicate the feature criteria is met or a binary 0 value to indicate the feature criteria is not met. Classification of a particular block according to the amount of occurrence of a feature in the block may be determined by independently setting the criteria for each feature. In one example, the criteria may be expressed as a set of thresholds (e.g., VHFthr, MThr, ESthr, MSthr). For example, when the thresholds VHFthr, MThr, ESthr, MSthr are implemented with values 10%, 2%, 5%, 7%, respectively, the blocks with an amount of Vertical High Frequency greater than 10% will have the value of VHF set to '1' (classified TRUE), and so on for the remaining features. The criteria may also be represented by a range of thresholds, for instance, only blocks with Vertical High Frequency greater than 10% but less than 40% will be classified as TRUE.

The binary indicators for the four features may be combined to produce a four-bit value that may be decoded by means of a programmable transfer function into a binary decision reflecting the coding mode (described in more detail below in connection with FIG. 8). The decisions may be generated as the input data is being acquired and organized as frame and field arrays. For example, when the MBAFF mode is enabled, a 4-bit field may be implemented in the statistics data that may be used to carry data which is generated by the block 106 and used by the block 108 for making the field/frame decision. The 4-bit value generally indicates a binary combination of the classified features (e.g., VHF, ES, MS and M) according to respective predetermined (or programmable) low/high thresholds.

The present invention may eliminate multiple passes as in other approaches. As the entire frame and field decisions are collected, by the end of a frame of video there may be a clear indication whether the frame should be coded as (a) full frame, (b) two full fields, or (c) adaptively frame/field for each macroblock.

Figure 6:
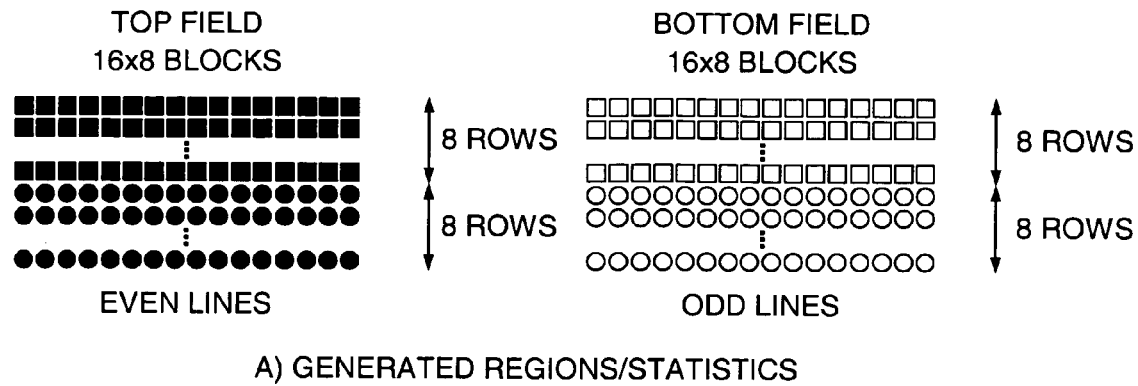
FIG. 6(A-B) are diagrams illustrating examples of arrangements of MBAFF data.
Figure 6:
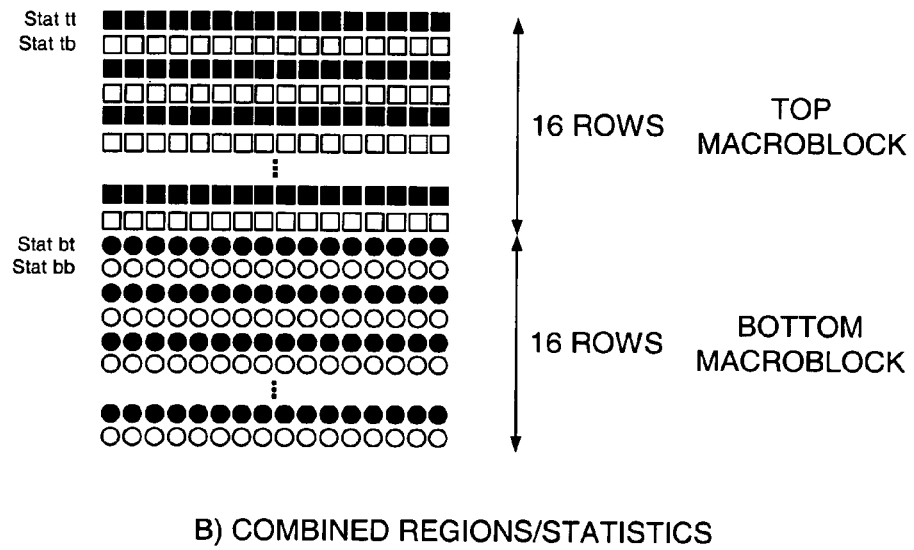

Referring to FIGS. 6(A-B), diagrams are shown illustrating examples of arrangements of MBAFF data in accordance with a preferred embodiment of the present invention. In the H.264/AVC standard, a macroblock represents a 16 horizontal (H) by 16 vertical (V) array of pixels having 16H×16V luminance samples and 8H×8V each of Cb and Cr chrominance samples. When MBAFF coding is used, macroblocks are coded in vertically adjacent pairs that comprise an array of 16H×32V pixels (i.e., 16H×32V luminance samples and 8H×16V each of Cb and Cr chrominance samples) from a frame. Each macroblock pair is coded either as two frame macroblocks (i.e., two sets of vertically adjacent 16H×16V pixels from the frame) or as two field macroblocks (i.e., one set from each of two fields of 16H×16V pixels). Hereafter the notation "macroblock (pair)" is used to mean (i) a single macroblock when MBAFF coding is not used and (ii) a macroblock pair when MBAFF coding is used.

The MBAFF decision is made for vertically adjacent pairs of macroblocks, and consequently statistics data for four 16×8 blocks are read in. The statistics data may be designated as follows:

$Stat_{tt}$—Statistics for top 16×8 block, top field (even) lines;
$Stat_{tb}$—Statistics for top 16×8 block, bottom field (odd) lines;
$Stat_{bt}$—Statistics for bottom 16×8 block, top field (even) lines;
$Stat_{bb}$—Statistics for bottom 16×8 block, bottom field (odd) lines.

A value may be extracted from each piece of statistics data and designated as follows:

$F_{tt}$—MBAFF code for top 16×8 block, top field (even) lines;
$F_{tb}$—MBAFF code for top 16×8 block, bottom field (odd) lines;
$F_{bt}$—MBAFF code for bottom 16×8 block, top field (even) lines;
$F_{bb}$—MBAFF code for bottom 16×8 block, bottom field (odd) lines.

For every macroblock pair (e.g., top and bottom vertically adjacent macroblocks) a decision is made whether to code the pair in either frame or field modes. The even lines of the macroblock pair correspond to what is otherwise known as the top field. The odd lines of the macroblock pair correspond to the bottom field. The macroblock pair coding decision is generally communicated to other modules in the encoding system 100 to affect mode selection.

Referring to FIG. 7, a table is shown illustrating an example of a MBAFF region truth table in accordance with a preferred embodiment of the present invention. Each of the region values (e.g., VHF, ES, MS, M) for a macroblock may be passed through a transfer function to generate a field indicator for the macroblock. In one example, the transfer function may be expressed by the following equation:

$$Field = MS + (ES)(M) + (VHF)(M)$$

In another example, the transfer function may be implemented as a look-up table (LUT). An example of a LUT 150 in accordance with the present invention is illustrated in FIG. 7. The LUT 150 generally contains field indicator data for every combination of the block statistics. In one example, minimization techniques may be used to simplify the look-up table. The use of a look-up table is generally preferred to allow for alternate operating decisions (parameters) to be programmed.

The look-up table may be configured to produce a field decision indicator based upon each of the four MBAFF feature statistics received from the block 106. Four field decision indicator values may be associated with each macroblock pair. The four field decision indicator values for a macroblock pair may be designated as:

$F_{tt}$—Field indicator for top 16×8 block, top field (even) lines;
$F_{tb}$—Field indicator for top 16×8 block, bottom field (odd) lines;
$F_{bt}$—Field indicator for bottom 16×8 block, top field (even) lines;
$F_{bb}$—Field indicator for bottom 16×8 block, bottom field (odd) lines.

In another embodiment, the four field indicator values for a macroblock pair may be used to compute field and frame encoding indicators for the macroblock pair as follows:

$$\text{field\_mode}=(F_{tt}==F_{bt})\&(F_{tb}==F_{bb})$$

$$\text{frame\_mode}=(F_{tt}==F_{tb})\&(F_{bt}==F_{bb})$$

When both field_mode and frame_mode encoding indicators are the same, a default value for field_coding may be selected:
if (field_mode !=frame_mode)
field_coding=field_mode;
else
field_coding=field_coding_default.

The field_coding indicator generally determines whether the statistics are combined in frame mode (see FIG. 4B) or field mode (see FIG. 4C). The field mode coding choice uses data as illustrated in FIG. 6A; while the frame mode uses data as illustrated in FIG. 6B.

Referring to FIG. 8, a table is shown illustrating an example of a MBAFF macroblock pair coding decision truth (or look-up) table 160 in accordance with a preferred embodiment of the present invention. The exemplary MBAFF decision look-up table (LUT) 160 generally illustrates using field/frame coding decisions based upon the statistics VHF, MS, ES and M (e.g., received from the block 106) and the combination of macroblock pair field indicators. In one example, the field indicator MBAFF code values for each macroblock pair are logically combined to generate a two-bit macroblock pair coding decision output value. In general, the combination of the values $F_{tt}$, $F_{bt}$, $F_{tb}$ and $F_{bb}$ to generate the output code allows the macroblock coding decision to take into account macroblock neighbors.

Referring to FIG. 9, a table is shown illustrating an example of definitions for different states of the macroblock coding decision outputs. In one example, when both bits of the macroblock pair coding decision output are the same, the encoding system may be configured to apply a MBAFF default mode. Alternatively, a MBAFF default mode may be indicated when both bits of the coding decision output are 0, while an undefined state is indicated when both bits of the output coding decision are 1. In one example, the value of the MBAFF default mode may be set by firmware based on global statistics. For example, in a case where high global motion is present, the firmware may bias decisions towards field coding. Alternatively, the MBAFF default mode setting may be over-ridden by other decisions made in the system 100. In one example, an output coding decision value of 01 may indicate field coding and an output coding decision value of 10 may indicate frame coding.

Figure 10:
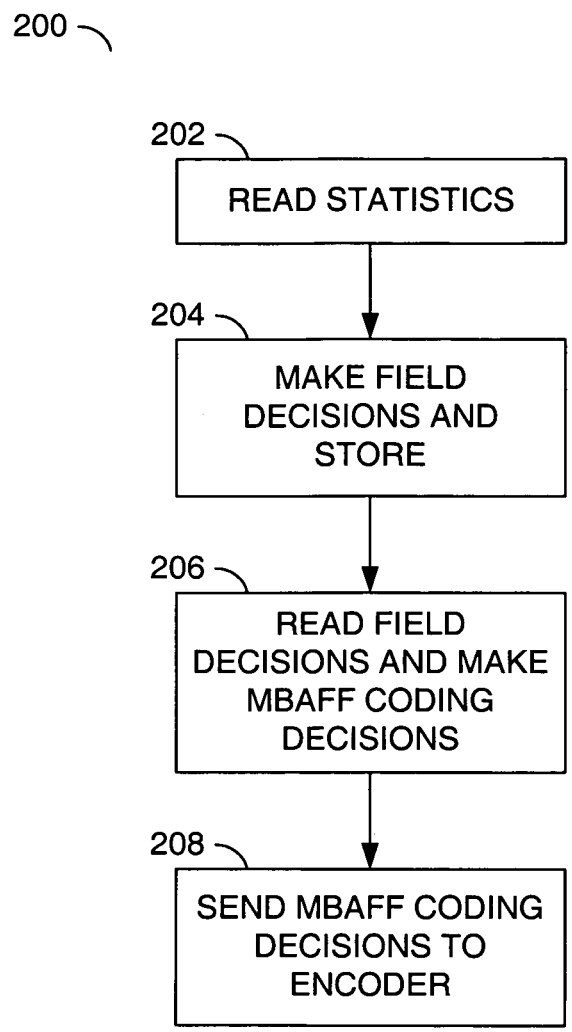
FIG. 10 is a flow diagram illustrating a process for making coding decisions in accordance with the present invention.

Referring to FIG. 10, a flow diagram is shown illustrating a process for making coding decisions in accordance with the present invention. The process 200 may comprise a state 202, a state 204, a state 206 and a state 208. The state 202 may be a read state. The state 204 may be a decision state. The state 206 may be a read state. The state 208 may be a send state.

When the process 200 is in the state 202, the process 200 may receive statistics concerning each macroblock of an input image. In one example, the process 200 may be configured to retrieve the statistics from a storage device. When the statistics have been read, the process 200 may move to the state 204. In the state 204, the process 200 generally is configured to make field decisions based upon the statistics. The field decisions generated are then stored. When the field decisions have been stored, the process 200 may move to the state 206. In the state 206, the process 200 may be configured to read field decisions for neighboring (e.g., vertically adjacent) macroblocks (e.g., a macroblock pair). The process 200 may be further configured to make MBAFF coding decisions based on the field decisions for the neighboring macroblocks. When the MBAFF coding decisions have been made, the process 200 may move to the state 208. In the state 208, the process 200 generally transfers the MBAFF coding decisions to other modules of the encoding system to affect mode selection.

Figure 11:
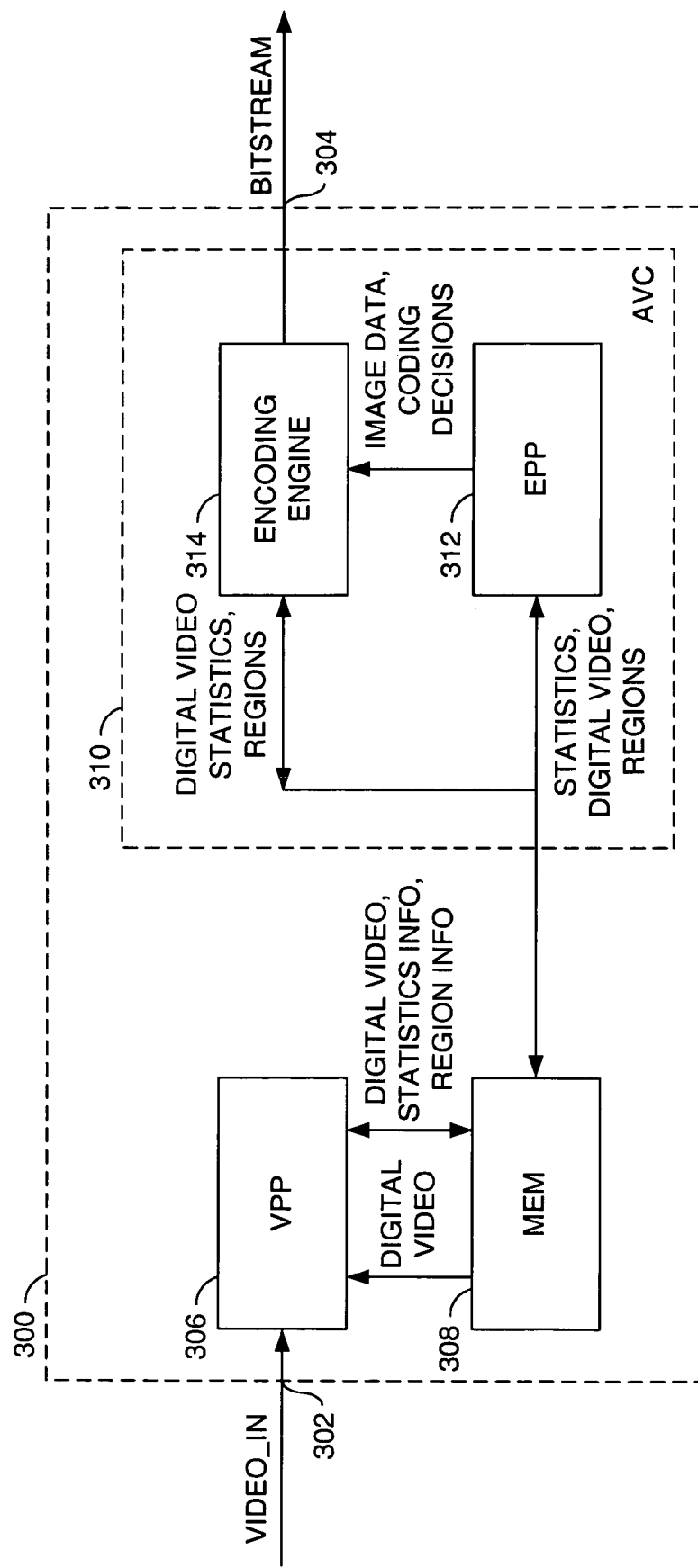
FIG. 11 is a block diagram illustrating an alternative embodiment of the present invention.

Referring to FIG. 11, a block diagram is shown illustrating a system 300 in accordance with another preferred embodiment of the present invention. In one example, the system 300 may be implemented as a preprocessing engine of a video CODEC (coder/decoder). In one example, the system 300 may be configured to condition an input video signal for improved compression and image quality. The system 300 may have an input 302 that may receive the signal VIDEO_IN and an output 304 that may present the signal BITSTREAM.

In one example, the system 300 may comprise a block (or circuit), 306, a block (or circuit) 308 and a block (or circuit) 310. The block 306 may be implemented, in one example, as a video preprocessor (VPP). The block 308 may be implemented, in one example, as a storage (or memory) device. The block 310 may be implemented, in one example, as an advanced video coding (e.g., H.264/AVC) encoding engine. In one example, the block 306 and the block 310 may be coupled via the block 308.

In one example, the block 306 may be configured to condition the signal VIDEO_IN to improve compression and image quality. For example, the block 306 may be configured to reduce a spectral content of the signal VIDEO_IN by shaping a signal bandwidth to match bit rate specifications of the block 310. In one example, the block 306 may include spatial and temporal noise reduction.

The block 306 may have a first input that may receive the signal VIDEO_IN, a second input that may receive a signal (e.g., digital video) from an output of the block 308 and an input/output that may be configured to transfer information (e.g., statistics, region data, image data, etc.) between the block 306 and the block 308 via a first input/output of the block 308. The block 308 may have a second input/output that may be configured to transfer information (e.g., statistics, region data, image data, etc.) between the block 308 and the block 310 via an input/output of the block 310. The block 310 may have an output the may present the signal BITSTREAM. In one example, the block 306 may be configured to generate a number of statistics for each macroblock of the signal VIDEO_IN that may be passed to the block 310 via the block 308. For example, the statistics generated for each macroblock by the block 306 may include, but are not limited to, vertical high frequency (VHF), motion (M), spatial edge strength (ES) and motion edge strength (MS). The block 310 may be configured to make decisions regarding frame and field coding based on the macroblock statistics retrieved from the block 308.

In one example, the block 310 may comprise a block (or circuit) 312 and a block (or circuit) 314. The block 312 may be implemented, in one example, as an encoder preprocessor (EPP). The block 314 may be implemented, in one example, as an encoding engine. In one example, the block 314 may be implemented as any of an AVC, H.264, H.26L video coder encoding engine. The block 312 may have an input that may receive information from the block 308 and an output that may be configured to present information to an input of the block 314. The block 314 may have an input/output that may be configured to transfer information between the block 308 and the block 314 and an output that may present the signal BITSTREAM. In one example, the signal BITSTREAM may be presented to the block 308 for storage.

Figure 12:
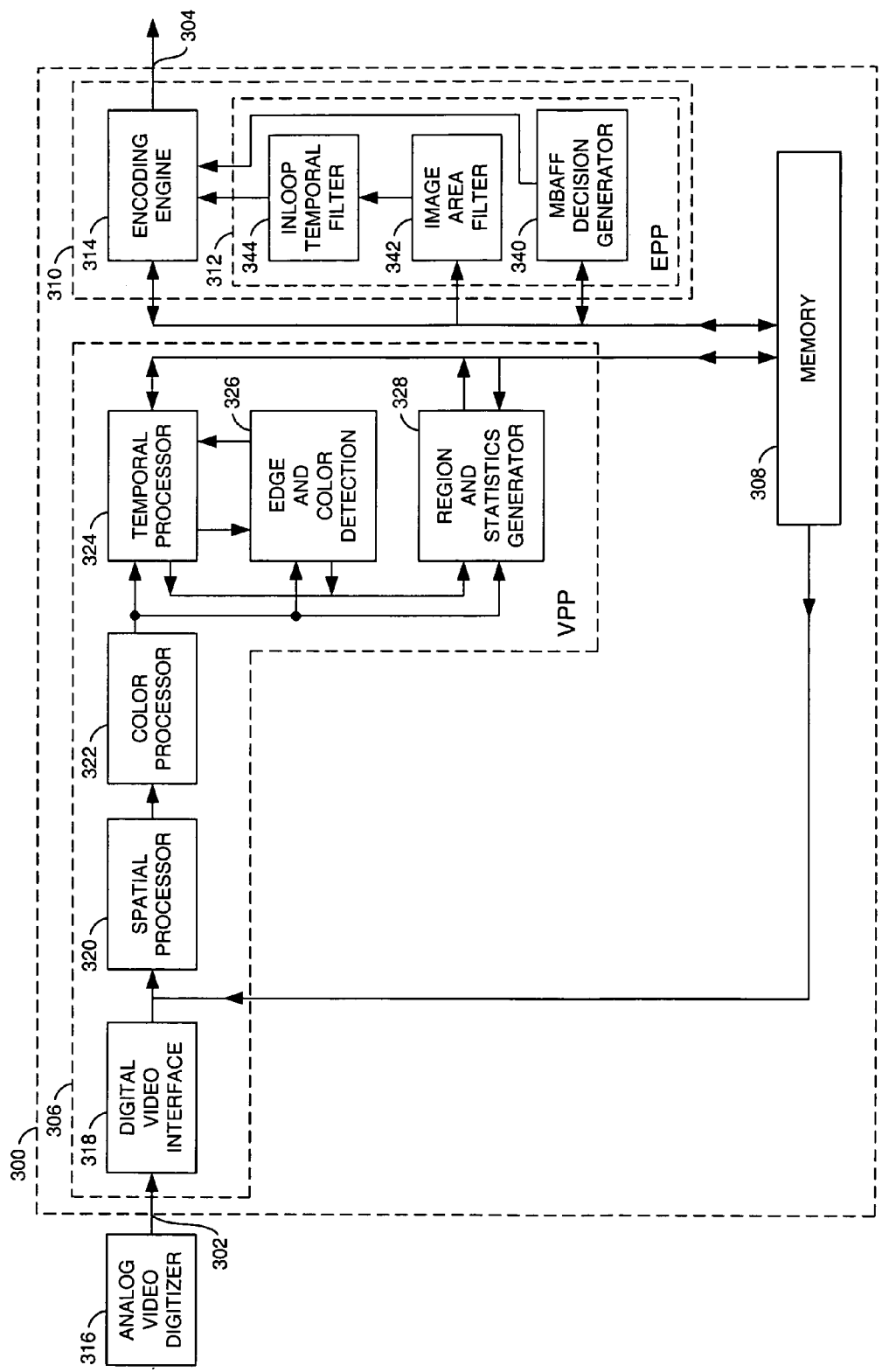
FIG. 12 is a more detailed block diagram of the alternative embodiment of FIG. 11.

Referring to FIG. 12, a more detailed block diagram is shown illustrating the system 300 of FIG. 11. In one example, the signal VIDEO_IN may be generated by an analog video digitizer 316. However, the input 302 may be configured to couple the system 300 to other sources of digital video to meet the design criteria of a particular implementation.

In one example, the block 306 may comprise a block (or circuit) 318, a block (or circuit) 320, a block (or circuit) 322, a block (or circuit) 324, a block (or circuit) 326 and a block (or circuit) 328. The block 318 may be implemented, in one example, as a digital video interface (DVI). The block 318 may be configured to accept any digital video format (e.g., ITU-656, ITU-601, SMPTE 292-M, etc.). The block 320 may be implemented, in one example, as a spatial processor. The block 322 may be implemented, in one example, as a color processor. The block 324 may be implemented, in one example, as a temporal processor. The block 326 may be implemented, in one example, as an edge and color detection block. The block 328 may be implemented, in one example, as a region and statistics generator. The blocks 318-328 may be implemented using conventional techniques.

The block 318 may have an input that may receive the signal VIDEO_IN from the block 316 and an output that may present a signal to an input of the block 320. In one example, the input of the block 320 may be configured to select between the signal received from the block 318 and the signal received from the block 308 via the second input of the block 306. The block 320 may have an output that may present a signal to an input of the block 322. The block 322 may have an output that may present a signal or signals to a first input of each of the blocks 324-328.

Each of the blocks 324 and 326 may have a first output that may present a signal to a second input of the block 328. The block 324 may have a second output that may present a signal to a second input of the block 326, a second input that may receive a signal from a second output of the block 326 and an input/output via which information may be transferred between the block 324 and the block 308. The block 328 may have a third input and an output, or an input/output, via which information may be transferred between the block 328 and the block 308.

In one example, the block 312 may comprise a block (or circuit) 340, a block (or circuit) 342 and a block (or circuit) 344. The block 340 may be implemented, in one example, as a MBAFF decision generator in accordance with the teachings of the present disclosure. The block 342 may be implemented, in one example, as an image area filter. The block 344 may be implemented, in one example, as an in-loop temporal filter. The block 342 may be implemented using conventional techniques. The block 344 may be implemented, in one example, in accordance with the teachings of a co-pending patent application Ser. No. 11/230,943, entitled "Method, System and Device for Improving Video Quality through In-Loop Temporal Pre-Filtering", filed Sep. 19, 2005, which is hereby incorporated by reference in its entirety.

The block 340 may have an input that may receive information from the block 308 and an output that may present MBAFF decision information to an input of the block 314. The block 342 may have an input that may receive information from the block 308 and an output that present information to the input of the block 344. The block 344 may have an output that may present information to the input of the block 314. In contrast to the block 306 which may be configured to process data in raster scan order (e.g., one horizontal line of video at a time), the block 312 may be configured to process data in macroblock order (e.g., one macroblock at a time in a row of macroblocks across the picture).

In contrast to other approaches that rely on higher level constructs like neighboring macroblock consideration, neighborhood variances, GOP level processing and rate control assistance, the present invention may achieve similar accuracy in selecting frame/field coding mode at all levels (e.g., from frame/field to macroblock) with only simple feature based mechanisms already available as part of a preprocessing step. However, the use of the higher level constructs is not precluded by the present invention and may be used to further improve selection accuracy. Even in the absence of pre-processing step, it is fairly simple for hardware to implement a linear FIR filter, a basic edge detector and a basic motion detector to derive the feature data. One reason for the relaxed simplicity is that the features may be considered as averaged over entire macroblocks and not at the pixel level (which would require far more stringent processing).

Existing approaches rely on macroblock variances and motion vector fields that require, close scrutiny of neighboring macroblocks, sometimes including previous frame/field coding decisions that may perpetuate selection errors. In contrast, the present invention generally relies on none of the above, and takes the approach of considering typical situations in which frame or field coding would be more efficient given the nature of input video. The features considered in the selection process are the features most important during interlaced coding and which provide an indication that points to the preferred coding conditions.

By using a simple mechanism to detect likely candidates for frame or field coding, and by taking into account facilities already provided by preprocessing, the present invention may provide a hardware solution that is more efficient and achieves compression and quality goals with less resources. The present invention may be configured to produce a very specific coding signature in response to edge information in both the spatial and temporal domains. In one example, only moving edges of large objects may be coded in field mode, while the internal areas of the objects may be steered towards frame coding. In another example, the present invention may produce bitstreams with coding decisions that rely on the amount of vertical detail, local motion and edge information when presented particular patterns.

The present invention may be used in any application that involves selecting field or frame coding modes, whether for entire frames or for individual macroblocks. The present invention may be used to provide efficient frame/field coding selection for the current MPEG-2, as well as the H.264/AVC standards, and beyond. The nature of the problem, as explained above, is fundamental to combining interlaced and progressive video coding.

The signals illustrated in FIGS. 1, 2, 11 and 12 generally represent logical data flows. The logical data flows are generally representative of physical data transferred between the illustrated blocks by, for example, address, data, and/or control signals and/or busses. The logical data flows are generally also representative of data transferred between program modules implementing the illustrated blocks. The system represented by the circuit 300 may be implemented in hardware, software (or firmware, or code) or a combination of hardware and software according to the teachings of the present disclosure, as would be apparent to those skilled in the relevant art(s).

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed or complemented) to meet the design criteria of a particular implementation. With respect to image data, the terms block and macroblock are generally used interchangeably herein.

The functions performed by the blocks illustrated in FIGS. 1, 2, 9, 11 and 12 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
an input interface, coupled to receive an input image, the input image comprising of a plurality of macroblock pairs, each of the plurality of macroblock pairs including a first macroblock and a second macroblock that are adjacent to each other, each macroblock comprising a top field including all even lines and a bottom field including all odd lines;
a first preprocessor circuit configured to generate a plurality of field decision indicator values, at least one of the plurality of field decision indicator values is associated with each of the top field in the first macroblock, the bottom field in the first macroblock, the top field in the second macroblock and the bottom field in the second macroblock, each of the plurality of field decision indicator values being based upon a plurality of macroblock-based feature statistics for the corresponding field;
a memory configured to store the plurality of field decision indicator values for each of the plurality of macroblock pairs; and
a second preprocessor circuit configured to generate a macroblock pair coding decision value for each of the plurality of macroblock pairs based upon a combination of the plurality of field decision indicator values, the macroblock pair coding decision value indicating a macroblock frame and field coding decision.

2. The apparatus according to claim 1, further comprising:
an encoding engine, coupled to receive the macroblock pair coding decision, the encoding engine selects between a frame coding mode and a field coding mode for the first and second macroblocks in response to the macroblock pair coding decision value.

3. The apparatus according to claim 2, wherein said encoding engine comprises an H.264/AVC compliant encoder/decoder (CODEC).

4. The apparatus according to claim 1, wherein said plurality of macroblock-based feature statistics comprises (i) a vertical high frequency (VHF) statistic, (ii) a motion detected (M) statistic, (iii) a spatial edge strength (ES) statistic and (iv) a motion edge strength (MS) statistic.

5. The apparatus according to claim 1, further comprising:
a third preprocessor circuit configured to generate said plurality of macroblock-based feature statistics for each macroblock of said input image based upon a plurality of threshold values.

6. The apparatus according to claim 5, wherein said third preprocessor circuit is configured to generate a signal indicating whether each of said plurality of macroblock-based feature statistics for each macroblock of said input image is within a range determined by respective ones of said plurality of threshold values.

7. The apparatus according to claim 1, wherein each of the plurality of field decision indicator values is related to the plurality of macroblock-based feature statistics for the corresponding field by a predefined transfer function.

8. The apparatus according to claim 1, wherein:
said first preprocessor circuit comprises a first look-up table (LUT) configured to generate said plurality of field decision indicator values; and
said second preprocessor circuit comprises a second LUT configured to generate said macroblock pair coding decision value.

9. The apparatus according to claim 1, further comprising:
a region and statistics generator circuit configured to generate said plurality of macroblock-based feature statistics for each macroblock of said input image.

10. An apparatus comprising:
means for receiving an input image, the input image comprising of a plurality of macroblock pairs, each of the plurality of macroblock pairs including a first macroblock and a second macroblock that are adjacent to each other, each macroblock comprising a top field including all even lines and a bottom field including all odd lines;
means for generating a plurality of field decision indicator values, at least one of the plurality of field decision indicator values is associated with each of the top field in the first macroblock, the bottom field in the first macroblock, the top field in the second macroblock and the bottom field in the second macroblock, each of the plurality of field decision indicator values being based upon a plurality of macroblock-based feature statistics for the corresponding field;
means for storing the plurality of field decision indicator values for each of the plurality of macroblock pairs; and means for generating a macroblock pair coding decision value for each of the plurality of macroblock pairs based upon a combination of the plurality of field decision indicator values, the macroblock pair coding decision value indicating a macroblock frame and field coding decision.

11. A method for selecting frame, field and macroblock comprising the steps of:
receiving an input image, the input image comprising of a plurality of macroblock pairs, each of the plurality of macroblock pairs including a first macroblock and a second macroblock that are adjacent to each other, each macroblock comprising a top field including all even lines and a bottom field including all odd lines;
generating a plurality of field decision indicator values, at least one of the plurality of field decision indicator values is associated with each of the top field in the first macroblock, the bottom field in the first macroblock, the top field in the second macroblock and the bottom field in the second macroblock, each of the plurality of field decision indicator values being based upon a plurality of macroblocks-based feature statistics for the corresponding field;
storing the plurality of field decision indicator values for each of the plurality of macroblock pairs in a memory; and
generating a macroblock pair coding decision value for each of the plurality of macroblock pairs based upon a combination of the plurality of field decision indicator values, the macroblock pair coding decision value indicating a macroblock frame and field coding decision.

12. The method according to claim 11, wherein said plurality of macroblock-based feature statistics comprises (i) a vertical high frequency (VHF) statistic, (ii) a motion detected (M) statistic, (iii) a spatial edge strength (ES) statistic and (iv) a motion edge strength (MS) statistic.

13. The method according to claim 11, further comprising the step of:
generating said plurality of macroblock-based feature statistics for each macroblock of said input image based upon a plurality of threshold values.

14. The method according to claim 13, further comprising the step of:
generating a signal indicating whether each of said plurality of macroblock-based feature statistics for each macroblock of said input image is within a range determined by respective ones of said plurality of threshold values.

15. The method according to claim 11, further comprising the step of:
encoding said input image using an H.264/AVC compliant CODEC.

16. The method according to claim 11, further comprising the step of:
selecting between a frame coding mode and a field coding mode for each macroblock pair based upon said macroblock pair coding decision value.

17. The method according to claim 11, wherein the step of generating the field decision indicator value comprises passing the plurality of macroblock-based feature statistics for the first macroblock through a predefined transfer function.

18. The method according to claim 11, wherein the step of generating the plurality of field decision indicator values of said input image comprises addressing a look-up table (LUT) using the plurality of macroblock-based feature statistics for the corresponding field.

19. The method according to claim 11, wherein the step of generating said macroblock pair coding decision value comprises addressing a lookup table using the combination of the plurality of field decision indicator values associated with each of said plurality of macroblock pairs.

20. The method according to claim 11, wherein the step of combining the plurality of field decision indicator values associated with each of the plurality of macroblock pairs comprises performing a logical combination of the plurality of field decision indicator values associated with the first and second macroblocks.

21. The apparatus according to claim 7, wherein said plurality of macroblock-based feature statistics for each macroblock comprises a first value, a second value, a third value, and a fourth value, and said transfer function comprises a sum of (i) said first value, (ii) a product of said second value and said third value, and (iii) a product of said second value and said fourth value.

22. The apparatus according to claim 21, wherein said plurality of macroblock-based feature statistic value refers to a motion of edges of objects between blocks across pictures, said second macroblock-based statistic value refers to an amount of any type of motion between blocks across pictures, said third macroblock-based statistic value refers to high frequency picture information along a vertical direction, and said fourth macroblock based statistic value refers to a strength of edges of objects occupying a block.

* * * * *